Sept. 18, 1923.

B. J. WALKER

LAWN MOWER

Filed Dec. 3, 1921

Inventor
B. J. Walker

By Mason Fenwick & Lawrence
Attorneys

Sept. 18, 1923.
B. J. WALKER
LAWN MOWER
Filed Dec. 3, 1921
1,468,425
2 Sheets-Sheet 2
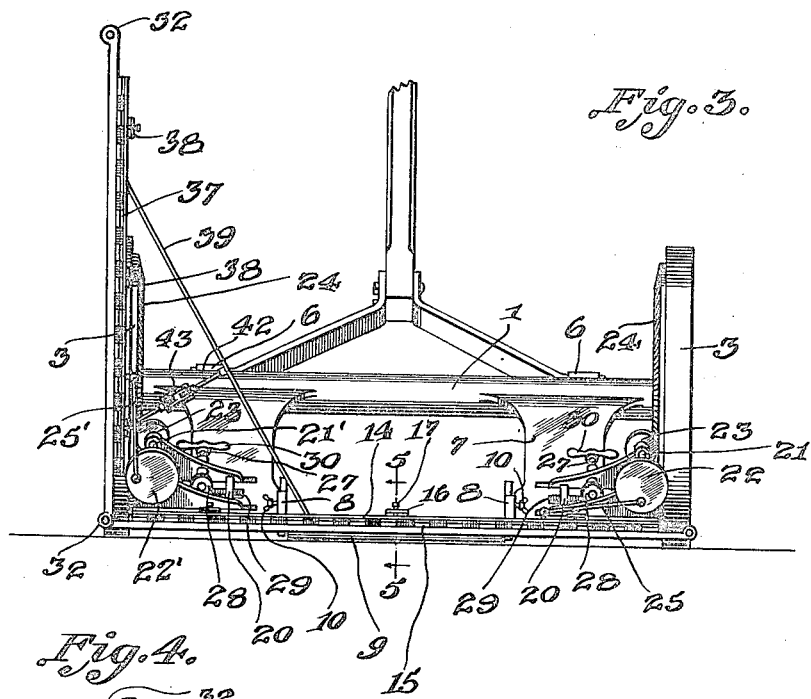
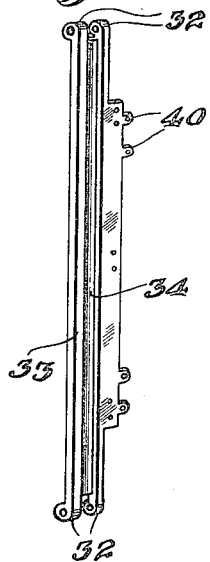
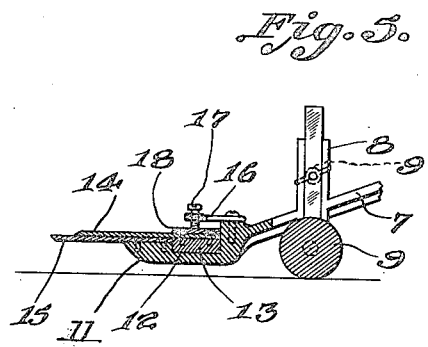
Inventor
B. J. Walker
By Mason Fenwick & Lawrence
Attorneys Patented Sept. 18, 1923.

1,468,425

UNITED STATES PATENT OFFICE.

BENJAMAN J. WALKER, OF LYNNVILLE, TENNESSEE.

LAWN MOWER.

Application filed December 3, 1921. Serial No. 519,752.

*To all whom it may concern:*

Be it known that I, BENJAMAN J. WALKER, a citizen of the United States, residing at Lynnville, in the county of Giles and State of Tennessee, have invented certain new and useful Improvements in Lawn Mowers; and I do hereby declare the following to be a full, clear, and exact description of the invention, such as will enable others skilled in the art to which it appertains to make and use the same.

This invention relates to new and useful improvements in lawn mowers, and more particularly to a mower of this character having means in connection therewith whereby hedges and shrubbery of this character may be easily trimmed along its side portions when so desired.

The main object of the present invention is the provision of a lawn mower constructed and arranged whereby an upright cutter bar may be quickly and readily attached to the main portion of the lawn mower to be utilized for cutting hedges and the like, said upright portion being provided with the usual cutter bar and suitable means being provided for connecting the cutter bar with the main operating mechanism of the lawn mower.

A further object of the present invention is the provision of a lawn mower having suitable adjustable means whereby the means which operates the cutter bar can be quickly engaged or disengaged with respect to the main driving power of the machine.

With the above and other objects in view, the invention consists in the novel features of construction, combination and arrangement of parts hereinafter more fully set forth, pointed out in the claims and shown in the accompanying drawings, in which:

Fig. 3 is a front elevation showing the upright cutter bar in position with respect to the lawn mower;

Fig. 4 is a detail perspective view of the supporting bracket for the upright cutter bar, and Fig. 5 is a transverse sectional view taken on the line 5—5 of Fig. 3, portions of the machine being eliminated.

Figure 1:
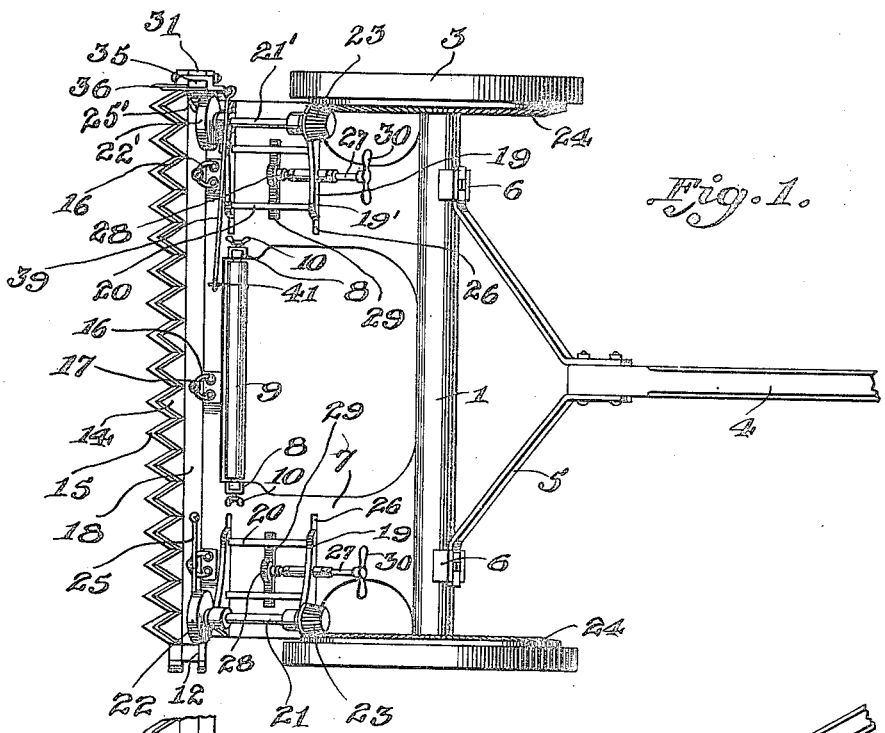
Figure 1 is a top perspective view of a lawn mower constructed in accordance with my invention.
Figure 2:
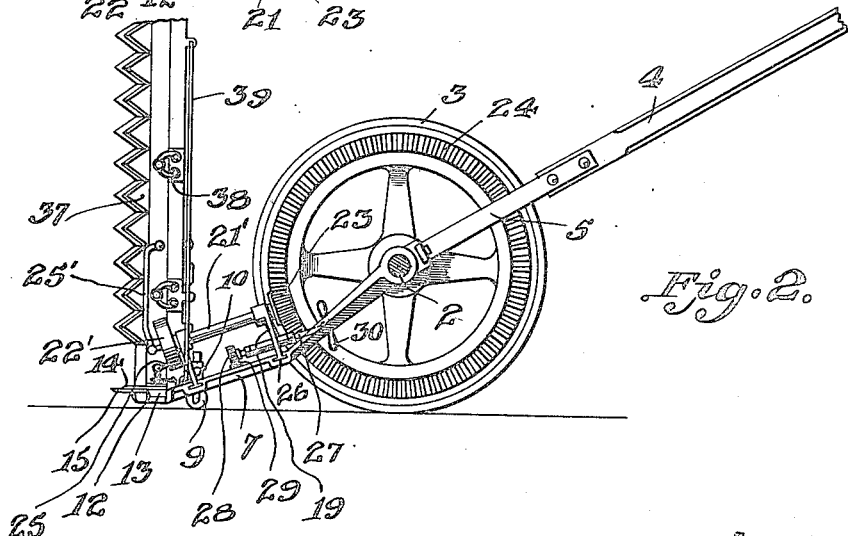
Fig. 2 is an end elevation showing one of the drive wheels removed.

Referring now more particularly to the drawings, the numeral 1 indicates a sleeve inclosing the drive shaft having spindles 2 at each end upon which the ground driving wheels 3 are secured in place in any well known manner. In order to impart movement to the wheels 3, through manual operation, a suitable handle 4 is provided, to the lower end of which are secured the connecting arms 5, the ends of which are bolted or otherwise secured to the brackets 6 carried by the sleeve 1.

Extending forwardly from the sleeve 1 is the main supporting body 7 of the machine preferably cut away at the central portion. Arranged upon opposite sides of the central portion at the lower end thereof are the upright guides 8 which receive adjustable bearing members in which the trunnions of the usual gage roller 9 are journalled. These bearing members can be readily adjusted within the guides 8 and retained in an adjusted position by means of the set screws 10. At the forward end of the body 7 is the usual guard and finger bar 11 grooved as at 12 to receive the reciprocating bar 13 which carries the cutting blades 14. The guard fingers 15 are carried by the main portion of the guard bar 11 and project outwardly beyond the knife portions of the cutter blade 14. This cutter blade is retained in position by having suitable clips 16 bolted or otherwise secured to the lower edge of the body 7 and provided with adjusting screws 17 for adjustment with the bearing plate 18 upon the upper face of the cutter whereby to retain the cutting knife in its proper position.

In order to utilize the cutting knives 14 when so desired and also whereby to disengage the motive power connected with the cutting knives, suitable means is provided whereby the cutting blade can be connected up with the operating power or disconnected therefrom at the will of the operator. This means consists of a carriage comprising two parallel side portions 19 connected by the cross strips 20. Mounted upon one end of the side portions 19 of the carriage is a shaft 21 having upon one end a crank disc 22 and a beveled gear 23 mounted upon the other end, both the disc and bevel gear being arranged upon the outside of the side portions of the carriage, the bevel gear 23 being adapted to be engaged with and disengaged from the beveled face 24 formed upon the inner face of one of the ground wheels 3. The disc 22 is connected by means of the rod 25 to the cutter bar 14 by means of the rod 25, said rod being eccentrically connected to the disc 22 whereby upon rotation of the shaft 21 the cutter bar will be readily reciprocated. The carriage is mounted for sliding movement upon the body 7 by having the lower edges of the side portions 19 movable within spaced grooves 26 and in order to impart movement to the carriage for moving the gear 23 into and out of mesh with the gear 24, a shaft 27 is provided which is mounted within one of the side portions 19 and extends inwardly between the two side portions to a point about midway, and upon the inner end of this shaft 27 is a pinion 28 cooperating with a rack 29 carried by the body 7 whereby upon rotation of the shaft 27, the pinion 28 will ride over the rack 29 and move the carriage toward and away from the ground wheel.

In order to manipulate this shaft 27, a hand grip 30 is attached to the outer end thereof whereby the same may be readily grasped by the hand of the operator and by rotating the shaft 27, move the carriage and shaft 21 toward and away from the ground wheel of the machine whereby to engage the gear 23 with or disengage the same from the gear 24.

In connection with the usual cutter bar utilized for cutting grass, etc., upon a fairly level surface, I provide means in connection therewith adapted to be utilized for trimming the sides of hedges and shrubbery. To this end the guard bar 11 is provided at each end with a sleeve 31 and arranged upon opposite sides of this sleeve 31 are the perforated ears 32 which are formed upon each end of an upright guide bar 33. This bar 33 is grooved as at 34 to receive the upright cutter bar 35 and the usual guard fingers 36 extend outwardly from the bar 33 and the cutting knives 37 are connected with the cutter bar 35 for reciprocation therewith. The cutter bar 35 is retained in position within the groove 34 by means of the clips 38 which are constructed and used the same as the clips 16 for the main horizontal cutting knife.

In order to retain the bar 33 in an upright position, a supporting rod 39 is connected at its upper end to one of the perforated ears 40 formed upon one edge of the bar 33, and the lower end is connected to the body of the machine as at 41. It will be noted that the bar 33 can be tilted slightly if desired and the upper end of the rod 39 connected to the lowermost of the ears 40. In order to retain the rod 39 in a taut position or adjust the same, an additional connecting rod 42 extends between the rod 39 and the bar 33 and having therein a turn buckle 43 whereby the tension of the rod 39 can be adjusted.

In order to connect up the cutter bar 35 with the motive power of the machine, a movable carriage having side portions 19' is mounted upon this side of the body of the machine, substantially the same in construction as the carriage upon the opposite side of the machine and the usual connecting rod 25' connects the crank disc 22' with the cutter bar 35 whereby upon rotation of the shaft 21' movement will be imparted to the cutter bar 35.

Attention is also called to the fact that this guide bar 33 can be readily mounted upon the side of the machine as suitable means is provided at both ends of the main guard support 11 for this purpose.

From the above description taken in connection with the accompanying drawings, it will be readily apparent that I have provided a new and improved mowing machine having means carried thereby whereby the motive power connected to the cutting bar can be quickly and readily disconnected or connected and also wherein means is provided in connection with the usual horizontal cutting bar of a lawn mower for trimming hedges and cutting shrubbery of a like character. The device in itself is very simple in construction and, it is believed, can be manufactured and placed upon the market at a comparatively small cost.

I claim:

1. A mowing machine including a body portion, supporting means thereon including a ground engaging drive wheel, a guard bar, a cutter bar movable thereon, a carriage mounted on the body and normally at rest thereon, mechanism on the carriage for transmitting motion from the ground wheel to the cutter bar, a rack on the body portion, a shaft on the carriage and a pinion on said shaft engaging said rack for moving the carriage toward and from the ground wheel.

2. A mowing machine including a body, ground wheels, a horizontally disposed guard bar, an upright guide bar, means for detachably connecting said guide bar to either end of said horizontal guard bar, a cutter bar on said horizontal guard bar, a cutter bar on said upright guide bar and separate similar transmission mechanisms arranged to transmit the motion of said respective ground wheels to said cutter bars respectively.

3. A mowing machine including a body, ground wheels, a horizontally disposed guard bar, an upright guide bar, means for detachably connecting said guide bar to either end of said horizontal guard bar, a cutter bar on said horizontal guard bar, a cutter bar on said upright guide bar, separate similar transmission mechanisms arranged to transmit the motion of said respective ground wheels to said cutter bars respectively and means associated with each transmission mechanism for disconnecting the respective cutter bars from the driving mechanism.

In testimony whereof I affix my signature.

B. J. WALKER.